(12) United States Patent
Liang et al.

(10) Patent No.: US 9,296,840 B2
(45) Date of Patent: Mar. 29, 2016

(54) FUNCTIONAL DIENE POLYMER, PREPARATION METHOD THEREOF, AND RUBBER COMPOSITION COMPRISING THE SAME

(71) Applicants: CHINA PETROLEUM & CHEMICAL CORPORATION, Beijing (CN); BEIJING RESEARCH INSTITUTE OF CHEMICAL INDUSTRY, Beijing (CN)

(72) Inventors: Aimin Liang, Beijing (CN); Lin Xu, Beijing (CN); Nini Wang, Beijing (CN); Xinhe Kang, Beijing (CN); Liangliang Qu, Beijing (CN); Ke Jiang, Beijing (CN); Chuanqing Li, Beijing (CN); Ximing Xie, Beijing (CN); Hui Liu, Beijing (CN); Wenjuan Sun, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 0 days.

(21) Appl. No.: 14/523,113

(22) Filed: Oct. 24, 2014

(65) Prior Publication Data
US 2015/0119528 A1     Apr. 30, 2015

(30) Foreign Application Priority Data

| Oct. 25, 2013 | (CN) | ............................ 2013 1 0512238 |
| Oct. 25, 2013 | (CN) | ............................ 2013 1 0512794 |
| Oct. 25, 2013 | (CN) | ............................ 2013 1 0512797 |
| Oct. 25, 2013 | (CN) | ............................ 2013 1 0513366 |
| Oct. 25, 2013 | (CN) | ............................ 2013 1 0513369 |

(51) Int. Cl.
| C08F 8/42 | (2006.01) |
| C08L 9/00 | (2006.01) |
| C08L 9/06 | (2006.01) |
| C08C 19/25 | (2006.01) |

(52) U.S. Cl.
CPC . *C08F 8/42* (2013.01); *C08C 19/25* (2013.01); *C08L 9/00* (2013.01); *C08L 9/06* (2013.01)

(58) Field of Classification Search
CPC ................ C08F 8/42; C08L 9/06; C08L 9/00
See application file for complete search history.

(56) References Cited

U.S. PATENT DOCUMENTS

| 467,583 | A | 1/1892 | Simons et al. |
| 5,227,425 | A | 7/1993 | Rauline |
| 6,984,706 | B2 * | 1/2006 | Karato et al. ................ 526/335 |
| 2005/0256284 | A1 | 11/2005 | Kerns et al. |
| 2014/0307030 | A1 * | 10/2014 | Uchimaya ..................... 347/47 |

FOREIGN PATENT DOCUMENTS

| EP | 0 334 042 A2 | 9/1989 |
| EP | 0 447 066 A1 | 9/1991 |
| JP | 2011-144349 A | 7/2011 |
| WO | 2008/145155 A1 | 12/2008 |

OTHER PUBLICATIONS

Search Report and Written Opinion issued by the Intellectual Property Office of Singapore on Jul. 21, 2015 in corresponding Singapore Patent Application No. 10201407122Y.

* cited by examiner

*Primary Examiner* — Nathan M Nutter
(74) *Attorney, Agent, or Firm* — Buchanan Ingersoll & Rooney PC

(57) ABSTRACT

The present invention provides a functional diene polymer, a preparation method thereof and a rubber composition comprising the functional diene polymer. The functional diene polymer comprises at least one type of conjugated diene structural units and silane coupler functional units represented by formula (I) in its molecular chain, and the number-average molecular weight of the functional diene polymer is 50,000~1,000,000; $R_1$-$R_4$ are $C_1$-$C_{20}$ linear or branched alkyl or heteroatom-containing $C_1$-$C_{20}$ linear or branched alkyl, and the heteroatom is selected from one or more of halogen, oxygen, sulfur, silicon, and phosphorus. Not only the relationship between the wet slip resistance and the rolling resistance of the functional diene polymer is effectively improved, but also the offensive odor produced in the rubber mixing process owing to the addition of the silane coupler is reduced.

formula (I)

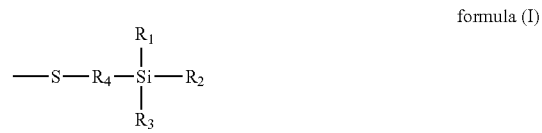

20 Claims, 1 Drawing Sheet

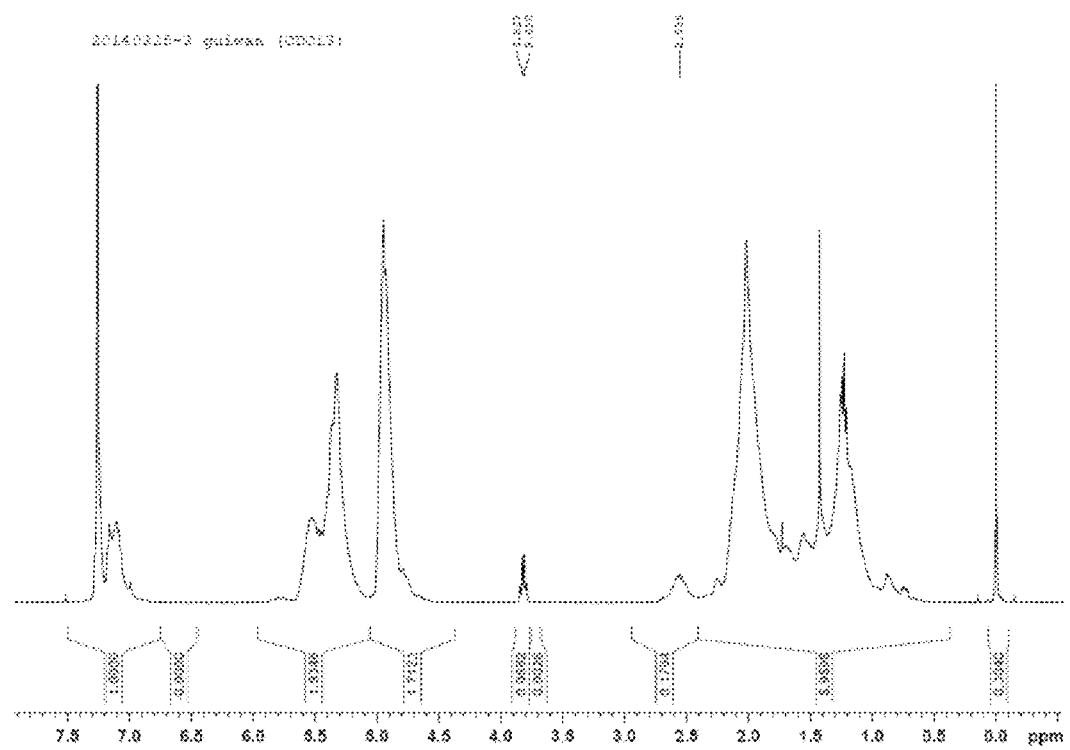

FUNCTIONAL DIENE POLYMER, PREPARATION METHOD THEREOF, AND RUBBER COMPOSITION COMPRISING THE SAME

CROSS REFERENCE TO RELATED APPLICATIONS

This application claims priorities to Chinese Application No. 201310512238.8, entitled "Modified Diene Polymer and Preparation Method and Use Thereof", Chinese Application No. 201310512794.5, entitled "Functional Diene Polymer and Preparation Method and Use Thereof", Chinese Application No. 201310513369.8, entitled "Modified Diene Polymer and Preparation Method and Use Thereof", Chinese Application No. 201310513366.4 and Chinese Application No. 201310512797.9, both entitled "Rubber Composition and Vulcanized Rubber", all filed on Oct. 25, 2013, which are specifically and entirely incorporated by reference.

FIELD OF THE DISCLOSURE

The disclosure relates to a functional diene polymer, a preparation method of the functional diene polymer, and a rubber composition comprising the functional diene polymer.

BACKGROUND OF THE DISCLOSURE

In recent years, as the automotive industry is developed and the petroleum price rises, people pay more and more attention to the safety and energy-saving performance of automobiles. Therefore, the tires desirably have not only high wet slip resistance but also low rolling resistance. However, it is often difficult to balance between improving wet slip resistance and decreasing rolling resistance. There is still a need for the best balance between high wet slip resistance and low rolling resistance, according to the specific application requirement.

For production of low-rolling resistance tires, solution polymerized styrene butadiene rubber (SSBR) produced by anionic solution polymerization has significant advantages over emulsion polymerized styrene butadiene rubber (ESBR), because anionic solution polymerization can effectively adjust the content and glass transition temperature of conjugated diene structural units in which the branched chains comprise double bonds. The advantages are beneficial for balancing the wet slip resistance with the rolling resistance of tires. Furthermore, studies have shown: by adding a silane coupler in the mixing process of rubber compositions, the dispersion of the packing material in crude rubber can be accelerated to some degree, and the relationship between wet slip resistance and rolling resistance of rubber can be improved to some degree. However, affected by other additives, the reactivity of silane coupler with crude rubber and carbon black decreases in the mixing process of rubber compositions. In addition, adding a silane coupler in the mixing process of rubber compositions may result in an offensive odor. The patent document EP447066 discloses a method of using a silane material having a structure represented by formula (1) as a modifier to improve the wet slip resistance and decrease the rolling resistance of styrene butadiene rubbers:

$$USi(OR')_j R''_{4-i-j} \qquad \text{formula (1)},$$

wherein, U is halogen, R' and R" are $C_1$-$C_{20}$ alkyl, aryl, vinyl, or alkylogen, j is an integer within the range of 1-4, i is an integer within the range of 0-2, and the sum of i and j is 2-4. The silane having a structure represented by formula (1) can be bonded to a polymer molecular chain by means of the reaction between halogen and catalyst residue at the ends of the polymer molecular chain. However, usually only one silane molecule can be bonded to a polymer molecular chain, and the resultant influence on the interaction between polymer molecular chains is very low, insufficient to effectively improve the wet slip resistance and decrease the rolling resistance of rubbers.

SUMMARY OF THE DISCLOSURE

To overcome the above-mentioned drawback in the method in the prior art, i.e., the relationship between wet slip resistance and rolling resistance of rubber can't be improved effectively, the disclosure provides a functional diene polymer that has high wet slip resistance and low rolling resistance, a preparation method of the functional diene polymer, and a rubber composition that comprises the functional diene polymer.

In a first aspect of the present invention, the disclosure provides a functional diene polymer, which comprises at least one type of conjugated diene structural unit in its molecular chain, wherein the diene polymer further comprises silane coupler functional units represented by formula (I) in its molecular chain, and the number-average molecular weight of the diene polymer is 50,000~1,000,000;

formula (I)

wherein $R_1$-$R_4$ are $C_1$-$C_{20}$ linear or branched alkyl or heteroatom-containing $C_1$-$C_{20}$ linear or branched alkyl, and the heteroatom is selected from one or more of halogen, oxygen, sulfur, silicon, and phosphorus.

In a second aspect of the present invention, the disclosure provides a preparation method of a functional diene polymer, comprising: in inert atmosphere and in existence of an initiator, controlling a diene polymer comprising at least one type of conjugated diene structural units to contact with a silane coupler so that the silane coupler is chemically bonded to the diene polymer, wherein the number-average molecular weight of the diene polymer is 50,000~1,000,000, and, calculated on the basis of the weight of the conjugated diene structural units in the diene polymer, the content of conjugated diene structural units that comprise double bonds in their branched chains in the diene polymer is 15-85 wt %, preferably 30-60 wt %, the silane coupler has a structure represented by formula (II):

formula (II)

wherein $R_1$-$R_4$ are $C_1$-$C_{20}$ linear or branched alkyl or heteroatom-containing $C_1$-$C_{20}$ linear or branched alkyl, and the heteroatom is selected from one or more of halogen, oxygen, sulfur, silicon, and phosphorus.

In a third aspect of the present invention, the disclosure provides another preparation method of a functional diene polymer, comprising the following steps:

(1) in inert atmosphere and in existence of an initiator, controlling a conjugated diene to have polymerization reaction in a solvent, to obtain a reaction product that comprises a diene polymer, under reaction conditions that ensure the number-average molecular weight of the obtained diene polymer is 50,000~1,000,000, wherein calculated on the basis of the weight of the conjugated diene structural units in the diene polymer, the content of conjugated diene structural units that comprise double bonds in their branched chains in the diene polymer is 15-85 wt %, preferably 30-60 wt %;

(2) in inert atmosphere and in existence of an initiator, controlling the obtained reaction product that comprises a diene polymer to contact with a silane coupler, such that the silane coupler is chemically bonded to the diene polymer, wherein, the silane coupler has a structure represented by formula (II):

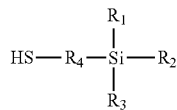

formula (II)

where, $R_1$-$R_4$ are $C_1$-$C_{20}$ linear or branched alkyl or heteroatom-containing $C_1$-$C_{20}$ linear or branched alkyl, and the heteroatom is selected from one or more of halogen, oxygen, sulfur, silicon, and phosphorus.

In a fourth aspect of the present invention, the disclosure provides a rubber composition, which comprises olefinic rubber, vulcanizing agent, vulcanization accelerator, strengthening agent, and activating agent, wherein, the olefinic rubber comprises the above-mentioned functional diene polymer.

As described above, in the prior art, usually a silane coupler is added in the mixing process of a rubber material to improve the wet slip resistance and decrease the rolling resistance of the rubber material. However, the reactivity of silane coupler with crude rubber and carbon black decreases in the mixing process. Consequently, not only the relation between wet slip resistance and rolling resistance of the rubber material can't be improved significantly, but also an offensive odor is produced. Through in-depth study, the inventor has found: by chemically bonding a silane coupler to a diene polymer with number-average molecular weight within the range of 50,000~1,000,000 and taking the obtained diene polymer as base rubber wholly or partially, the problem of decreased reactivity of silane coupler with crude rubber and carbon black in the mixing process of the rubber material can be avoided, the relationship between wet slip resistance and rolling resistance of the tire produced from the diene polymer can be effectively balanced, and the offensive odor produced in the mixing process of the rubber material owing to the addition of the silane coupler can be reduced. Other characteristics and advantages of the disclosure will be further detailed in the embodiments hereunder.

BRIEF DESCRIPTION OF THE DRAWINGS

The FIGURE shows an $^1$HNMR spectrogram of the functional diene polymer obtained in Example S-II-8 of the disclosure.

DETAILED DESCRIPTION OF THE EMBODIMENTS

Hereunder the embodiments of the present invention will be detailed, with reference to the accompanying drawings. It should be appreciated that the embodiments described here are only provided to describe and explain the present invention, but shall not be deemed as constituting any limitation to the present invention.

The functional diene polymer provided in the disclosure comprises at least one type of conjugated diene structural units in its molecular chain, wherein, the molecular chain of the diene polymer further comprises silane coupler functional units represented by formula (I), and the number-average molecular weight of the functional diene polymer is 50,000~1,000,000;

formula (I)

wherein, $R_1$-$R_4$ are $C_1$-$C_{20}$ linear or branched alkyl or heteroatom-containing $C_1$-$C_{20}$ linear or branched alkyl, and the heteroatom is selected from one or more of halogen, oxygen, sulfur, silicon, and phosphorus; preferably, $R_1$-$R_3$ are $C_1$-$C_5$ linear or branched alkyl or linear or branched alkoxyl, and $R_4$ is $C_1$-$C_5$ linear or branched alkylene.

The examples of the $C_1$-$C_5$ linear or branched alkyl include, but are not limited to: methyl, ethyl, n-propyl, iso-propyl, n-butyl, sec.-butyl, isobutyl, tert.-butyl, n-pentyl, iso-pentyl, tert.-pentyl, and neo-pentyl; the examples of the $C_1$-$C_5$ linear or branched alkoxyl include, but are not limited to: methoxy, ethoxy, n-propoxy, isopropoxy, n-butoxy, sec.-butoxy, isobutoxy, tert.-butoxy, n-pentyloxy, isopentyloxy, tert.-pentyloxy, and neo-pentyloxy; the examples of the $C_1$-$C_5$ linear or branched alkylene include, but are not limited to: methylene, ethylidene, n-propylidene, iso-propylidene, n-butylidene, iso-butylidene, n-pentylidene, and iso-pentylidene.

Particularly preferably, in the formula (I), $R_1$-$R_3$ are methoxy, and $R_4$ is propylidene, and, in that case, the silane coupler that corresponds to the silane coupler functional unit in formula (I) is trimethoxysilylpropanethiol; or, $R_1$-$R_3$ are ethoxy, and $R_4$ is propylidene, and, in that case, the silane coupler that corresponds to the silane coupler functional unit in formula (I) is triethoxysilylpropanethiol; or, $R_1$-$R_3$ are methyl, and $R_4$ is ethylidene, and, in that case, the silane coupler that corresponds to the silane coupler functional unit in formula (I) is 2-(trimethylsilyl) ethanethiol.

As shown in the FIGURE, the inventor has found that the $^1$HNMR spectrogram of the functional diene polymer in the disclosure exhibits a quartet at 3.7-3.9 chemical shift. The quartet matches the characteristic peak of the hydrogen atom on the methylene adjacent to the oxygen atom in the silane coupler, and doesn't exist in the olefinic raw material. Thus, the characteristic peak is judged as the characteristic peak of the hydrogen atom on the methylene adjacent to the oxygen atom in the silane coupler functional unit, and can be used as a basis for judging whether the silane coupler is bonded to the polymer chain. In addition, the content of the silane coupler functional units in the diene polymer can be calculated according to the peak areas of the peaks in the spectrogram.

In the disclosure, the $^1$HNMR spectrogram is measured with an AVANCE DRX 400 MHz nuclear magnetic resonance spectrometer from Bruker (a Swiss company) at room temperature, and the solvent is deuterated chloroform.

According to a preferred embodiment of the disclosure, the functional diene polymer further comprises one or more of monovinylarene structural units. In that case, in the molecular chain of the functional diene polymer, the monovinylarene structural units and conjugated diene structural units constitute the principal chain of the polymer; whereas the silane coupler functional unit shown in formula (I) is bonded to the conjugated diene structural units in the principal chain.

In the disclosure, to obtain a functional diene polymer with higher wet slip resistance and lower rolling resistance, calculated on the basis of the total weight of the functional diene polymer, the content of the silane coupler functional units is preferably 0.01-10 wt %, more preferably 0.2-2 wt %; the content of the conjugated diene structural units is preferably 90-99.99 wt %, more preferably 98-99.8 wt %. In the case that the functional diene polymer further comprises monovinylarene structural units, the total content of the conjugated diene structural units and monovinylarene structural units is preferably 90-99.99 wt %, more preferably 98-99.8 wt %. Furthermore, the weight ratio of the monovinylarene structural unit to the conjugated diene structural unit can be 5:95~60:40, preferably 20:80~40:60.

There is no particular restriction on the number-average molecular weight and molecular weight distribution of the diene polymer in the disclosure. For example, the number-average molecular weight can be 50,000~1,000,000, preferably 150,000~200,000; the molecular weight distribution can be 1-4, preferably 1-1.5. Both the number-average molecular weight and the molecular weight distribution can be measured with a LC-10AT gel permeation chromatograph (GPC) from Shimadzu, wherein, THF is used as a moving phase, narrow-distribution polystyrene is used as a standard sample, and the test temperature is 25° C.

According to another embodiment of the present invention, the functional diene polymer in the disclosure comprises at least two types of conjugated diene structural units.

According to the disclosure, the conjugated diene structural units are structural units derived from conjugated diene, i.e., structural units formed by polymerization of conjugated diene(s). The conjugated diene refers to unsaturated acrylic hydrocarbons that comprise conjugated double bonds (i.e., —C=C—C=C—). The conjugated diene can be an ordinary choice in the art, and can be selected appropriately according to the application scenario of the diene polymer obtained finally. For example, the conjugated diene can be selected from one or more of butadiene, isoprene, 1,3-pentylene, 1,3-hexadiene, and 2,3-dimethyl butadiene, and preferably is butadiene and/or isoprene.

According to the disclosure, the monovinylarene structural units are structural units derived from monovinylarene, i.e., structural units polymerized from monovinylarene. The monovinylarene can be any ordinary aromatic monomer that has a vinyl as substituent in the aromatic ring. Usually, the monovinylarene has the structure shown in formula (III):

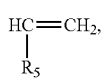

formula (III)

Where, $R_5$ can be $C_6$-$C_{20}$ substituted or unsubstituted aryl, preferably phenyl or phenyl substituted by one or more $C_1$-$C_5$ alkyls.

According to the disclosure, the examples of the C6-C20 substituted or unsubstituted aryl include, but are not limited to: phenyl, methyl phenyl, ethyl phenyl, tert.-butyl phenyl, dodecyl phenyl, di-n-butyl phenyl (including o-di-n-butyl phenyl, m-di-n-butyl phenyl, and p-di-n-butyl phenyl), n-propyl phenyl, and diethyl phenyl (including o-di-n-ethyl phenyl, m-di-n-ethyl phenyl, and p-di-n-ethyl phenyl).

According to the disclosure, particularly preferably the monovinylarene is one or more of styrene, vinyl toluene, α-methylstyrene, 4-tert-butyl styrene, and 4-methyl styrene.

The preparation method of a functional diene polymer provided in the disclosure comprises: in inert atmosphere and in existence of an initiator, controlling a diene polymer that comprises at least one type of conjugated diene structural units to contact with a silane coupler such that the silane coupler can be chemically bonded to the diene polymer; wherein, the number-average molecular weight of the diene polymer is 50,000~1,000,000, and, calculated on the basis of the weight of the conjugated diene structural units in the diene polymer, the content of conjugated diene structural units that comprise double bonds in their branched chains in the diene polymer is 15-85 wt %, preferably 30-60 wt %, the silane coupler has a structure represented by formula (II):

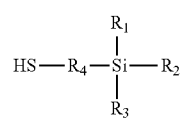

formula (II)

where, $R_1$-$R_4$ are $C_1$-$C_{20}$ linear or branched alkyl or heteroatom-containing $C_1$-$C_{20}$ linear or branched alkyl, and the heteroatom is selected from one or more of halogen, oxygen, sulfur, silicon, and phosphorus; preferably, $R_1$-$R_3$ are $C_1$-$C_5$ linear or branched alkyl or linear or branched alkoxyl, and $R_4$ is $C_1$-$C_5$ linear or branched alkylene.

The content of conjugated diene structural units that comprise double bonds in their branched chains can be measured with a AVANCE DRX 400 MHz nuclear magnetic resonance spectrometer from Bruker (a Swiss company), wherein the solvent is deuterated chloroform. The measuring method is well known by those skilled in the art. Therefore, it will not be detailed here. Preferably, the functional diene polymer that comprises at least one type of conjugated diene structural units further comprises one or more types of monovinylarene structural units, and the weight ratio of the monovinylarene structural unit to the conjugated diene structural unit is 5:95~60:40, preferably 20:80~40:60.

According to the disclosure, the diene polymer can be prepared with any preparation method in the art. For example, the preparation method can comprise: in inert atmosphere and in existence of an initiator, controlling a polymerizable monomer that comprises at least one type of conjugated diene to have polymerization reaction in a solvent, under reaction conditions that ensure the number-average molecular weight of the obtained diene polymer is 50,000~1,000,000, wherein, calculated on the basis of the weight of the conjugated diene structural units in the diene polymer, the content of conjugated diene structural units that comprise double bonds in their branched chains in the diene polymer is 15-85 wt %, preferably 30-60 wt %.

According to the disclosure, when a functional diene polymer that comprises monovinylarene structural units and conjugated diene structural units is prepared, there is no particular restriction on the amount of the monovinylarene and conjugated diene in the disclosure, and the amount can be selected appropriately according to the expected diene polymer. For example, the weight ratio of the monovinylarene to the conjugated diene can be 5:95~60:40, preferably 20:80~40:60.

According to the disclosure, the inert atmosphere refers to any gas or gas mixture that will not have any chemical reaction with the reactants and product. For example, the inert atmosphere can be nitrogen, or one or more of the zero-group gasses indicated in the periodic table of elements. The inert atmosphere can be maintained by filling any gas or gas mixture that doesn't have any chemical reaction with the reactants and product into the reaction system.

According to the disclosure, in the preparation process of the diene polymer, the initiator can be any existing initiator that can initiate polymerization of the conjugated diene, such as an organolithium initiator. For example, the organolithium initiator can be an organolithium initiator with molecular formula as RLi, wherein, R is linear or branched alkyl, cycloalkyl, or aryl. Specifically, the organolithium initiator can be selected from one or more of ethyl lithium, propyl lithium, isopropyl lithium, n-butyl lithium, sec.-butyl lithium, pentyl lithium, hexyl lithium, cyclohexyl lithium, phenyl lithium, methoxyphenyl, and naphthyl lithium, and preferably is n-butyl lithium and/or sec.-butyl lithium. Alternatively, a dilithium initiator can be used in the disclosure, such as trimethylene dilithium and/or tetramethylene dilithium. There is no particular restriction on the useage of the initiator, and the usage can be selected appropriately according to the designed molecular weight. Those skilled in the art can appreciate: to prepare a diene polymer with higher molecular weight, the usage of the initiator can be decreased, but the rate of polymerization will be decreased accordingly; to prepare a diene polymer with lower molecular weight, the dose of the initiator can be increased, but the rate of polymerization will be increased accordingly. In comprehensive consideration of the rate of polymerization and the molecular weight of the obtained functional diene polymer, preferably the usage of the initiator is 0.15-2.5 mmol, when calculated on the basis of the total weight of 100 g polymerizable monomer.

There is no particular restriction on the conditions of the polymerization reaction. Usually, the conditions include polymerization temperature, polymerization pressure, and polymerization duration. To facilitate the polymerization reaction, the polymerization temperature is preferably 10-160° C., more preferably 40-80° C.; the polymerization pressure is preferably 0.05-0.5 MPa, more preferably 0.1-0.3 MPa. Generally speaking, longer polymerization duration is beneficial for improving the conversion ratios of the reactants and the yield ratio of the reaction product, but excessive polymerization duration has little contribution to further improvement of the conversion ratios of the reactants and the yield ratio of the reaction product. Hence, in comprehensive consideration of the polymerization efficiency and effect, the polymerization duration is preferably 0.5-10 h, more preferably 0.5-2 h.

The pressure values mentioned in the disclosure are gage pressure values.

According to the disclosure, in the preparation process of the functional diene polymer, the solvent can be any substance that can be used as a reaction medium; for example, the solvent can be hydrocarbon solvent and/or ether solvent. The hydrocarbon solvent can be one or more of $C_5$-$C_7$ naphthenic hydrocarbon, aromatic hydrocarbon, and isoalkane. The examples of the hydrocarbon solvent include, but are not limited to: benzene, methyl benzene, pentane, heptane, n-hexane, and cyclohexane. The ether solvent can be $C_4$-$C_{15}$ monoether and/or polyether. The examples of the ether solvent include, but are not limited to: tert.-butoxy ethoxy ethane and/or tetrahydrofuran. Those solvents can be used individually or in mixture. The amount of the solvent can be selected appropriately according to the amount of the monomer; for example, the amount of the solvent can ensure that the total concentration of the conjugated diene is 1-30 wt %, preferably 5-20 wt %.

According to the disclosure, after the polymerization reaction is completed, a coupler can be added into the polymeric system, so as to couple the diene polymer with each other at least in part. The coupler is well known by those skilled in the art. For example, the coupler can be one or more of polyvinyl compound, halide, ether, aldehyde, ketone, and ester. Specifically, the coupler can be selected from one or more of divinyl benzene, tetravinyl silane, tetrachloromethane, silicon tetrachloride, tin tetrachloride, dimethyl terephthalate, and epoxy soybean oil, and is preferably selected from one or more of divinyl benzene, silicon tetrachloride, and tin tetrachloride. It should be noted: in the case that the coupler is a silane compound, the silane compound is different from the silane coupler that has a structure represented by formula (II).

There is no particular restriction on the amount of the coupler, and the amount can be selected appropriately according to the dose of the initiator; for example, the mole ratio of the coupler to the initiator can be 0.1~2:1, preferably 0.1~1:1.

According to the disclosure, preferably, a structure modifier can be added in the preparation process of the diene polymer, so as to effectively control the microstructure of the diene polymer. The structure modifier can be any existing substance that can modify the microstructure of the diene polymer. For example, the structure modifier can be selected from one or more of ether, dibutyl ether, tetrahydrofuran, ethylene glycol dimethyl ether, diethylene glycol dimethyl ether, dioxane, crown ether, ethyl tetrahydrofurfuryl ether, triethylamine, tetramethyl ethylene diamine, hexamethyl phosphoryl triamide, potassium tert-butoxide, potassium tert-pentyloxide, potassium lauryl phosphate, potassium alkyl benzene sulfonate, and sodium alkyl benzene sulfonate. Generally speaking, the mole ratio of the structure modifier to the initiator used in preparation of the diene polymer can be 1-100:1, preferably 80-100:1.

Generally speaking, the anionic polymerization reaction system doesn't have apparent termination reaction and transfer reaction, which is to say, the active site still exists after all monomer is consumed. Hence, after the polymerization reaction is completed, the obtained polymer solution is contacted with a terminating agent, so as to deactivate the active site. The amount of the terminating agent can be selected appropriately according to the dose of the initiator used in preparation of the diene polymer. Usually, the mole ratio of the terminating agent to the initiator used in preparation of the diene polymer can be 0.1-1:1. The terminating agent can be any reagent that can deactivate the anionic active site in the art. For example, the terminating agent can be selected from one or more of water, methyl alcohol, ethyl alcohol, and isopropyl alcohol, and preferably is isopropyl alcohol. There is no particular restriction on the conditions of contact between the diene polymer and the silane coupler, as long as the conditions ensure that the silane coupler can be chemically bonded to the diene polymer. For example, the conditions of contact usually include contact temperature, contact pressure, and contact duration. Generally speaking, to facilitate the silane coupler chemically bonding to the diene polymer, the contact temperature is preferably 20-150° C., more preferably 40-90° C.; the contact pressure is preferably 0.01-1 MPa, more preferably 0.1-0.5 MPa; the contact duration is preferably 0.2-24 h, more preferably 0.5-5 h.

According to the disclosure, when the diene polymer contacts with the silane coupler, to make a tradeoff between the initiation rate and the molecular weight of the functional diene polymer, calculated on the basis of the total weight of the diene polymer and silane coupler that has the structure represented by formula (II), the amount of the initiator is preferably 0.01-0.1 wt %, more preferably 0.01-0.08 wt %. The initiator can be one or more of the radical initiators well known by those skilled in the art, such as azo initiator, peroxide initiator, and redox initiator, etc.

The azo initiator can be selected from one or more of dimethyl 2,2'-azobis(2-methylpropionate), 2,2'-azobis[2-methylpropionamidine]dihydrochloride, azobisformamide, 2,2'-azobis[2-(2-imidazolin-2-yl)propane]dihydrochloride, 1-((cyano-1-methylethyl)azo)formamide, 1,1'-azobis(cyclohexane-1-carbonitrile), 4,4'-azobis(4-cyanovaleric acid), 2,2'-azobis[2-(2-imidazolin-2-yl)propane]dihydrochloride, 2,2'-azobis(2-methylpropionitrile), 2,2'-azobis-(2-methylbutyronitrile), and 2,2'-azobisisoheptonitrile.

The peroxide initiator can be selected from one or more of hydrogen peroxide, ammonium persulfate, sodium persulfate, potassium persulfate, benzoyl peroxide, and tert-butyl peroxybenzoate.

The redox initiator is selected from one or more of sulfate-sulfite, persulfate-thiourea, persulfate-organic salt, and ammonium persulfate-aliphatic amine. Specifically, the sulfate-sulfite can be selected from one or more of sodium sulfate-sodium sulfite, potassium sulfate-potassium sulfite, and ammonium sulfate-ammonium sulfite; the persulfate-thiourea can be selected from one or more of sodium persulfate-thiourea, potassium persulfate-thiourea, and ammonium persulfate-thiourea; the persulfate-organic salt can be selected from one or more of sodium persulfate-potassium acetate, potassium persulfate-potassium acetate, and ammonium persulfate-ammonium acetate; the ammonium persulfate-aliphatic amine can be selected from ammonium persulfate-N,N-tetramethyl ethylene diamine and/or ammonium persulfate-diethylamine.

According to the disclosure, the amount of the diene polymer and the silane coupler that has the structure represented by formula (II) can be selected and changed in a wide range. For example, calculated on the basis of 100 g diene polymer, the amount of the silane coupler can be 0.01-10 g, preferably 0.1-5 g, more preferably 0.2-2 g.

In addition, the disclosure further provides another preparation method of the functional diene polymer, comprising the following steps:

(1) in inert atmosphere and in existence of an initiator, controlling a polymerizable monomer that comprises conjugated diene to have polymerization reaction in a solvent, to obtain a reaction product that comprises a diene polymer, under reaction conditions that ensure the number-average molecular weight of the obtained diene polymer is 50,000~1,000,000, wherein, calculated on the basis of the weight of the conjugated diene structural units in the diene polymer, the content of conjugated diene structural units that comprise double bonds in their branched chains in the diene polymer is 15-85 wt %, preferably 30-60 wt %;

(2) in inert atmosphere and in existence of an initiator, controlling the obtained reaction product that comprises a diene polymer to contact with a silane coupler, under contact conditions that ensure the silane coupler is chemically bonded to the diene polymer, wherein, the silane coupler has a structure represented by formula (II):

formula (II)

wherein, $R_1$-$R_4$ are $C_1$-$C_{20}$ linear or branched alkyl or heteroatom-containing $C_1$-$C_{20}$ linear or branched alkyl, and the heteroatom is selected from one or more of halogen, oxygen, sulfur, silicon, and phosphorus; preferably, $R_1$-$R_3$ are $C_1$-$C_5$ linear or branched alkyl or linear or branched alkoxyl, and $R_4$ is $C_1$-$C_5$ linear or branched alkylene.

Preferably, the polymerizable monomer that comprises conjugated diene further comprises one or more types of monovinylarenes.

The species and amount of the substances in step (1) and (2) and the polymerization reaction conditions and contact conditions can be selected appropriately as instructed above, and will not be detailed here anymore.

According to the disclosure, after the functional diene polymer is prepared, optionally different kinds of additives can be added to the obtained functional diene polymer. For example, the additive can be an aging inhibitor, so that the obtained functional diene polymer can have high aging resistance property. The species and amount of the additives can be selected normally in the art, and will not be described anymore here.

According to the disclosure, after an aging inhibitor is added, the functional diene polymer can be settled out from the solution by purification and precipitation, centrifugal separation, filtering, decantation, or agglomeration in hot water, etc.; or, the solvent in the reaction system can be removed by gas stripping. Those methods are well known by those skilled in the art, and will not be detailed further here.

With the method described above, the functional diene polymer disclosed in the disclosure can be prepared. The functional diene polymer can be used as a base rubber.

Moreover, the disclosure provides a rubber composition, which comprises olefinic rubber, vulcanizing agent, vulcanization accelerator, strengthening agent, and activating agent, wherein, the olefinic rubber comprises the above-mentioned functional diene polymer.

Preferably, calculated on the basis of the total weight of the olefinic rubber, the content of the functional diene polymer in the olefinic rubber is 50-100 wt %, preferably 80-100 wt %.

According to a preferred embodiment of the disclosure, the olefinic rubber also comprises mixed rubber, and the mixed rubber is selected from one or more of natural rubber, polybutadiene rubber, styrene-butadiene rubber, polyisoprene rubber, neoprene rubber, butyl rubber, and ethylene propylene diene terpolymer rubber. The mixed rubber can be purchased commercially or prepared with any method known by those skilled in the art. Therefore, it will not be detailed further here. Preferably, calculated on the basis of 100 pbw modified olefinic polymer, the content of the mixed rubber is 10-40 pbw, the content of the vulcanizing agent is 1-3 pbw, the content of the vulcanization accelerator is 3-5 pbw, the content of the strengthening agent is 70-90 pbw, and the content of the activating agent is 3-4 pbw.

The contents of the functional diene polymer, mixed rubber, vulcanizing agent, vulcanization accelerator, strengthening agent, and activating agent comprised in the rubber composition can be selected normally in the art. For example, calculated on the basis of 100 pbw functional diene polymer, the content of the mixed rubber can be 10-40 pbw, the content of the vulcanizing agent can be 1-3 pbw, the content of the vulcanization accelerator can be 3-5 pbw, the content of the strengthening agent can be 70-90 pbw, and the content of the activating agent can be 3-4 pbw.

According to the disclosure, the vulcanizing agent can be selected normally in the art. For example, the vulcanizing agent can be selected from one or more of insoluble sulfur, dithiodimorpholine, and tetrathiodimorpholine, and is preferably insoluble sulfur. The insoluble sulfur is an allotrope of sulfur, which is insoluble in sulfur dioxide and other solvents and insoluble in rubber, but exists in a dispersed state in rubber; when reaching the vulcanizing temperature, the insoluble sulfur dispersed in rubber will undergo an "activation phase", i.e., chain-end degradation. Thus, the vulcanization can be accelerated, the sulfur consumption can be reduced, and the aging resistance performance of the rubber can be improved.

According to the disclosure, the vulcanization accelerator can be any substance that can shorten the vulcanizing time, decreasing the vulcanizing temperature, and reduce the consumption of the vulcanizing agent and improve the physical and mechanical properties of the rubber. However, to obtain a rubber composition that is more environment friendly, preferably the vulcanization accelerator is sulphenamide vulcanization accelerator and/or guanidine vulcanization accelerator; the sulphenamide vulcanization accelerator is preferably selected from one or more of N-tertbutyl-2-benzothiazolyl sulphenamide, N-cyclohexyl-2-benzothiazolyl sulphenamide, and N-oxydiethylene-2-benzothiazolyl sulphenamide; the guanidine vulcanization accelerator is preferably diphenyl guanidine and/or di-o-tolyl guanidine. The N-tertbutyl-2-benzothiazolyl sulphenamide is commercially available with a trade name as TBBS or NS, and is a vulcanization accelerator with outstanding performance. Its structural formula is represented by formula (IV):

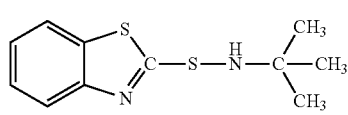

formula (IV)

According to the disclosure, the strengthening agent is known by those skilled in the art. For example, the strengthening agent can be carbon black and/or white carbon black. The carbon black can be any existing carbon black that can be used for rubber compositions in the art. For example, the carbon black can be selected from one or more of industrial reference carbon black 7#, high abrasion furnace black (HAF) N330, and medium super abrasion furnace black (MSAF) N220. The white carbon black can be any existing white carbon black that can improve the strength of the rubber composition, and is commercially available. For example, it can be white carbon black 115GR from Degussa.

According to the disclosure, the activating agent can be selected normally in the art. For example, it can be stearic acid and/or zinc oxide.

Furthermore, according to the physical circumstance, the rubber composition provided in the disclosure can optionally comprise aging inhibitor and/or silane type coupler, so as to further enhance the aging resistance and wet slip resistance performance of the rubber composition and reduce the rolling resistance. The aging inhibitor described here can be the same as or different from the aging inhibitor added in the preparation process of the functional diene polymer. In addition, the silane type coupler described here is different from the silane coupler having the structure represented by formula (II), which is used in the preparation process of the functional diene polymer. The silane type coupler described here usually doesn't comprise mercapto group. For example, it can be one or more of bis-[γ-3-(triethoxysilyl)propyl]-tetrasulfide, triphenyl(vinyl)silane, and silicon tetrachloride. The species and amount of the aging inhibitor and silane type coupler can be selected normally in the art, and will not be described anymore here.

Furthermore, the disclosure provides a vulcanized rubber obtained from the rubber composition by homogeneous mixing and vulcanization.

The main improvement in the disclosure is in that an innovative rubber composition is provided; whereas, the methods for mixing homogeneously and vulcanizing the rubber composition can be selected normally in the art, and is well known by those skilled in the art. Therefore, the methods will not be detailed further here.

Hereunder the present invention will be further detailed in some embodiments. In the following embodiments, the content of the silane coupler functional units is calculated and obtained in two approaches. The first approach is a formula-based approach: content of silane coupler=input of silane coupler×conversion ratio of mercapto group/(input of conjugated diene+input of monovinylarene+input of silane coupler×conversion ratio of mercapto group)×100%. The result is referred to as the content of silane coupler functional units calculated on the basis of the conversion ratio of mercapto group. Unless otherwise indicated, the content of the silane coupler functional units is the content of silane coupler functional units calculated on the basis of the conversion ratio of mercapto group. The second approach is to calculate the peak area (the quartet at 3.8 ppm shift) in the $^1$HNMR spectrogram, and the result is referred to as the content of silane coupler functional units calculated on the basis of the peak area in the H-nuclear magnetic resonance spectrogram.

In the following examples and comparative examples, the conversion ratio of mercapto group is measured with an Agilent 7890A gas chromatograph, and the test conditions include: chromatographic column: SPB-5 60 m×0.32 mm×1.0 μm capillary column, column flow rate: 2.0 ml/min., column temperature: 220° C., temperature of gasification chamber: 220° C., temperature of detection chamber: 250° C., diversion ratio: 50:1, sample size: 0.3 μl.

The content of conjugated diene structural units that comprise double bonds in their branched chains and the content of silane coupler functional units are measured with an AVANCE DRX 400 MHz nuclear magnetic resonance spectrometer from Bruker (a Swiss company), and are calculated according to the peak area. The solvent is deuterated chloroform.

Before the nuclear magnetic resonance test, the obtained polymer is extracted, to remove any possible unreacted silane coupler in it. Specifically, the extraction operations include: weigh the sample and then load the sample into an extractor, use a methyl benzene/ethyl alcohol mixture prepared at 3/7 volume ratio as the solvent, extract further with acetone for 2 h after 4 h primary extraction, dry for 4 h at 60° C. in vacuum, and then weigh the mixture. Repeat the steps till the weight of the dry sample doesn't change any more.

The number-average molecular weight and molecular weight distribution are measured with an ALLIANCE2690 gel permeation chromatography (GPC) from WATERS (a US company), wherein, THF is used as the moving phase, narrow-distribution polystyrene is used as the standard sample, and the temperature is 25° C.

The Mooney viscosity is measured with a SMV-300 Mooney viscometer from Shimadzu (a Japanese company) with the method specified in GB/T1232-92.

Content of conjugated diene structural units=input of conjugated diene/(input of conjugated diene+ input of silane coupler×conversion ratio of mercapto group+input of monovinylarene)×100%;

content of monovinylarene structural units=input of monovinylarene/(input of monovinylarene+input of silane coupler×conversion ratio of mercapto group+input of conjugated diene)×100%.

The properties of vulcanized rubber are tested with the following methods:
(1) Test of Glass Transition Temperature (Tg):
Measure with a MDSC2910 differential scanning calorimetry (DSC) from TA company (USA), wherein, the modulation period is 60 s, the modulated amplitude is ±1.5° C., the heating rate is 10° C./min., nitrogen protection is used, and the flow rate is 50 mL/min.
(2) Test of Mechanical Properties:
Produce the vulcanized rubber into vulcanized rubber plates in 2 mm thickness, cut the obtained vulcanized rubber plates into dumbbell-shaped standard plates with a Type 1 dumbbell-shaped cutter specified in GB/T528-1998, and test the mechanical properties of the vulcanized rubber plates in a rubber tensile tester (Model AG-20KNG, from Shimadzu) at 25° C. test temperature and 500 mm/min. pulling speed, to obtain the ultimate tensile strength and maximum elongation of the vulcanized rubber.
(3) Test of Shore a Hardness:
Test with the method specified in GB/T531-1999.
(4) Test of Deformation Resistance:
Cut the vulcanized rubber into dumbbell-shaped standard plates with a Type 1 dumbbell-shaped cutter specified in GB/T528-92, and test the samples at 25° C. test temperature and 500 mm/min. pulling speed, till the samples are pulled apart. Hold the broken sample for 3 min., and then mate the two parts together, and measure the distance between mated parallel lines. Next, calculate the permanent deformation at failure:

$S_b=100(L_t-L_0)/L_0$, where, $S_b$ is permanent deformation at failure, %; $L_t$ is the distances between mated parallel lines, mm; $L_0$ is initial test length, mm.
(5) Heat Generation Test:
Test with a Y3000E compressive heat generation tester from Beijing Youshen Electronic Instruments Co., Ltd., wherein, the test temperature is 55° C., the test duration is 25 min., and the compression frequency is 30 cycles/s.
(6) Test of Wet Slip Resistance and Rolling Resistance:
Test the wet slip resistance and rolling resistance of the vulcanized rubber with a DMA-2980 viscoelastometer from TA company (USA), wherein, the test frequency is 2 Hz, the heating rate is 5° C./min., the test temperature is 100° C., and the sample size is 40 mm×5 mm×1 mm. The wet slip resistance of the rubber is characterized by tan δ at 0° C., wherein, the greater the tan δ is, the higher the wet slip resistance is; the rolling resistance of the rubber is characterized by tan δ at 60° C., wherein, the smaller the tan δ is, the lower the rolling resistance of the rubber is; the dispersion of the packing material in the rubber is characterized by Tan δ (at 0° C.)/Tan δ (at 60° C.), wherein, the higher the value is, the better the dispersion is.

Example I-1

(1) Add 2,288 g cyclohexane, 180.00 g butadiene and 1.0 g ethyl tetrahydrofurfuryl ether into a 5 L stainless steel stirred tank reactor under high-purity nitrogen shielding, heat up to 50° C., add 1.2 mmol n-butyl lithium and control the pressure at 0.2 MPa to initiate reaction, and let the reaction to proceed for 2 h, to obtain a solution that comprises diene polymer. The number-average molecular weight of the diene polymer is 160,000; in addition, calculated on the basis of the weight of butadiene structural units in the diene polymer, the content of conjugated diene structural units that comprise double bonds in their branched chains in the diene polymer is 55.40 wt %.

(2) add 0.8 mL (0.836 g) trimethoxysilylpropanethiol into the product obtained in step (1) and immediately take samples and test the amount of mercapto group; then, heat up to 75° C. and add 6.7 mg 2,2'-azobis(2-methylpropionitrile), control the pressure at 0.2 MPa and let the reaction to proceed for 2 h, to obtain a functional diene polymer, take samples and test the amount of mercapto group, and take samples and dry the samples for 12 h in vacuum at 60° C., and then extract, dry for 12 h in vacuum at 60° C., and carry out $^1$HNMR test. Add 0.2 g Irganox 1520 aging inhibitor into the functional diene polymer, and dry the mixture for 24 h in vacuum at 60° C. The conversion ratio of mercapto group is 80%, the Mooney viscosity of the functional diene polymer is 45, the number-average molecular weight of the functional diene polymer is 160,000, and the molecular weight distribution is 1.1; calculated on the basis of the total weight of the functional diene polymer, the content of butadiene structural units is 99.63 wt %, and the content of trimethoxysilylpropanethiol functional units is 0.37 wt %. The content of silane coupler functional units calculated according to the peak area in the $^1$HNMR spectrogram is 0.37 wt %. The polymer doesn't emit any offensive odor.

Example I-2

(1) Add 2,288 g cyclohexane, 200.00 g butadiene and 0.65 g ethyl tetrahydrofurfuryl ether into a 5 L stainless steel stirred tank reactor under high-purity nitrogen shielding, heat up to 40° C., add 1.0 mmol n-butyl lithium and control the pressure at 0.1 MPa to initiate reaction, and let the reaction to proceed for 2 h, to obtain a solution that comprises diene polymer. The number-average molecular weight of the diene polymer is 166,000; in addition, calculated on the basis of the weight of butadiene structural units in the diene polymer, the content of conjugated diene structural units that comprise double bonds in their branched chains in the diene polymer is 39.90 wt %.

(2) add 0.6 mL (0.627 g) trimethoxysilylpropanethiol into the product obtained in step (1) and immediately take samples and test the amount of mercapto group; then, heat up to 40° C. and add 13 mg 2,2'-azobis(2-methylpropionitrile), control the pressure at 0.1 MPa and let the reaction to proceed for 5 h, to obtain a functional diene polymer, take samples and test the amount of mercapto group, and take samples and dry the samples for 12 h in vacuum at 60° C., and then extract, dry for 12 h in vacuum at 60° C., and carry out $^1$HNMR test. Add 0.2 g Irganox 1520 aging inhibitor into the diene polymer, and dry the mixture for 24 h in vacuum at 60° C. The conversion ratio of mercapto group is 82%, the Mooney viscosity of the diene polymer is 49, the number-average molecular weight of the functional diene polymer is 166,000, and the molecular weight distribution is 1.3; calculated on the basis of the total weight of the functional diene polymer, the content of butadiene structural units is 99.74 wt %, and the content of trimethoxysilylpropanethiol functional units is 0.26 wt %. The content of silane coupler functional units calculated according to the peak area in the $^1$HNMR spectrogram is 0.25 wt %. The polymer doesn't emit any offensive odor.

Example I-3

(1) Add 2,288 g hexane, 52.00 g isoprene and 5 ml tetrahydrofuran into a 5 L stainless steel stirred tank reactor under high-purity nitrogen shielding, heat up to 75° C., add 0.4 mmol n-butyl lithium and control the pressure at 0.3 MPa to initiate reaction, and let the reaction to proceed for 0.5 h, to obtain a solution that comprises diene polymer. The number-average molecular weight of the diene polymer is 161,000; in addition, calculated on the basis of the weight of isoprene structural units in the diene polymer, the content of conjugated diene structural units that comprise double bonds in their branched chains in the diene polymer is 35.00 wt %.

(2) add 1.06 mL (1.045 g) triethoxysilylpropanethiol into the product obtained in step (1) and immediately take samples and test the amount of mercapto group; then, heat up to 90° C. and add 30 mg 2,2'-azobis(2-methylpropionitrile), control the pressure at 0.5 MPa and let the reaction to proceed for 0.5 h, to obtain a functional diene polymer, take samples and test the amount of mercapto group, and take samples and dry the samples for 12 h in vacuum at 60° C., and then extract, dry for 12 h in vacuum at 60° C., and carry out $^1$HNMR test. Add 0.08 g Irganox 1520 aging inhibitor into the functional diene polymer, and dry the mixture for 24 h in vacuum at 60° C. The conversion ratio of mercapto group is 89%, the Mooney viscosity of the functional diene polymer is 46, the number-average molecular weight of the functional diene polymer is 161,000, and the molecular weight distribution is 1.05; calculated on the basis of the total weight of the functional diene polymer, the content of isoprene structural units is 98.24 wt %, and the content of triethoxysilylpropanethiol functional units is 1.76 wt %. The content of silane coupler functional units calculated according to the peak area in the $^1$HNMR spectrogram is 1.74 wt %. The polymer doesn't emit any offensive odor.

Example I-4

Prepare a diene polymer with the method described in the Example I-1, but replace the trimethoxysilylpropanethiol with 2-trimethylsilyl ethanethiol in the same pbw, to obtain the diene polymer. The conversion ratio of mercapto group is 72%, the Mooney viscosity of the diene polymer is 41, the number-average molecular weight of the functional diene polymer is 156,000, and the molecular weight distribution is 1.03; calculated on the basis of the total weight of the functional diene polymer, the content of butadiene structural units is 99.67 wt %, and the content of 2-trimethylsilyl ethanethiol functional units is 0.33 wt %. The content of silane coupler functional units calculated according to the peak area in the $^1$HNMR spectrogram is 0.31 wt %. The polymer doesn't emit any offensive odor.

Comparative Example I-1

Prepare a diene polymer with the method described in the Example I-1, but exclude the step (2), to obtain the diene polymer. The Mooney viscosity is 45, the number-average molecular weight is 160,000, and the molecular weight distribution is 1.09.

Comparative Example I-2

(1) Add 1500 g cyclohexane, 20 g butadiene and 2.7 g ethyl tetrahydrofurfuryl ether into a 5 L stainless steel stirred tank reactor under high-purity nitrogen shielding, heat up to 40° C., add 12 mmol n-butyl lithium and control the pressure at 0.4 MPa to initiate reaction, and let the reaction to proceed for 1 h, to obtain a solution that comprises diene polymer. The number-average molecular weight of the diene polymer is 1,000; in addition, calculated on the basis of the weight of butadiene structural units in the diene polymer, the content of conjugated diene structural units that comprise double bonds in their branched chains in the diene polymer is 67 wt %.

(2) add 20 g trimethoxysilylpropanethiol into the product obtained in step (1) and immediately take samples and test the amount of mercapto group; then, heat up to 100° C. and add 1 g dilauroyl peroxide, control the pressure at 0.4 MPa and let the reaction to proceed for 5 h, to obtain a functional diene polymer, take samples and test the amount of mercapto group, and take samples and dry the samples for 12 h in vacuum at 60° C., and then extract, dry for 12 h in vacuum at 60° C., and carry out $^1$HNMR test. Finally, dry for 24 h in vacuum at 80° C. The conversion ratio of mercapto group in the diene polymer is 80%, and the number-average molecular weight of the diene polymer is 1788. Calculated on the basis of the total weight of the diene polymer, the content of trimethoxysilylpropanethiol functional units is 44.4 wt %. The content of silane coupler functional units calculated according to the peak area in the $^1$HNMR spectrogram is 43.2 wt %.

Examples I-5~I-8

(1) Preparation of Compound Mix

Mix homogeneously 35 pbw functional diene polymer prepared in the Examples I-1~I-4 with 10 pbw natural rubber, 55 pbw solution polymerized styrene butadiene rubber SSBR2305 (from Dongguan Huaxiang Trade Co., Ltd.), 1 pbw stearic acid (SA1801, from SUMI ASIH), 10 pbw wear-resistant furnace black N330 (from Tianjin Jinquishi (Carbon Black) Chemical Co., Ltd.), and 60 pbw white carbon black 115GR (from Degussa) respectively, and carry out heat treatment in a Haake unit, wherein, the heat treatment temperature is 150° C., the rotation speed is 30 rpm/min., and the heat treatment duration is 7 min. After the heat treatment, load the mixture into a compounding mill, and add 2.5 pbw zinc oxide (from Liuzhou Zinc Product Co., Ltd.), 1 pbw stearic acid (SA1801, from SUMI ASIH), 2 pbw aging inhibitor 4020, 1.4 pbw N-cyclohexyl-2-benzothiazol sulphenamide (CZ, from Hebi Lianhao Chemical Co., Ltd.), 0.75 pbw diphenyl guanidine (DPG, from Guangzhou Lida Rubber Material Trade Co., Ltd.), and 6 pbw silane coupler Si (from Degussa), and carry out compounding for 60 min. at 50±5° C., to obtain compound mix H-I-1~H-I-4.

(2) Preparation of Vulcanized Rubber

Carry out vulcanization treatment for the compound mix H-I-1~H-I-4 obtained in step (1) in a press vulcanizer at 150° C. temperature and 12 MPa pressure respectively for 40 min., to obtain vulcanized rubber S-I-1~S-I-4. The properties of the vulcanized rubbers are shown in Table 1.

Comparative Example I-3

Prepare rubber with the method described in the Example I-5, but replace the functional diene polymer prepared in the Example I-1 with the diene polymer obtained in the Comparative Example I-1, and change the feed amount of diene polymer to 34.87 pbw; in addition, add 0.13 pbw trimethoxysilylpropanethiol in the preparation process of the compound mix; in that way, a comparative vulcanized rubber DS-I-1 is obtained. The properties of the vulcanized rubber are shown in Table 1.

Comparative Example I-4

Prepare rubber with the method described in the Example I-7, but replace the functional diene polymer prepared in the Example I-3 with a mixture of 99.17 pbw diene polymer obtained in the Comparative Example I-1 and 0.83 pbw diene polymer obtained in the Comparative Example I-2, to obtain a vulcanized rubber DS-I-2. The properties of the vulcanized rubber are shown in Table 1.

stainless steel stirred tank reactor under high-purity nitrogen shielding, heat up to 80° C., add 1.0 mmol n-butyl lithium and control the pressure at 0.3 MPa to initiate reaction, and let the reaction to proceed for 0.5 h, to obtain a solution that comprises diene polymer. The number-average molecular weight of the diene polymer is 194,000; in addition, calculated on the basis of the weight of conjugated diene structural units in the diene polymer, the content of conjugated diene structural units that comprise double bonds in their branched chains in the diene polymer is 40.02 wt %, the content of styrene structural units is 21.74 wt %, and the content of butadiene structural units is 78.26 wt %.

TABLE 1

| Item | S-I-1 | S-I-2 | S-I-3 | S-I-4 | DS-I-1 | DS-I-2 |
|---|---|---|---|---|---|---|
| Ultimate tensile strength/MPa | 21.3 | 20.9 | 19.5 | 20.9 | 21.5 | 20.2 |
| Specific elongation/% | 333 | 372 | 399 | 313 | 378 | 401 |
| Shore hardness A | 72 | 72 | 72 | 72 | 72 | 72 |
| Permanent deformation/% | 7 | 8 | 8 | 7 | 7 | 10 |
| Heat generation/° C. | 26.6 | 27.2 | 26.1 | 26.9 | 28.0 | 27.7 |
| tanδ (0° C.) | 0.2933 | 0.2539 | 0.2513 | 0.3054 | 0.2681 | 0.2755 |
| tanδ (60° C.) | 0.09870 | 0.09155 | 0.09025 | 0.09633 | 0.1063 | 0.1131 |
| tanδ (0° C.)/tanδ (60° C.) | 2.97 | 2.77 | 2.78 | 3.17 | 2.52 | 2.45 |

Example II-1

(1) Add 2,288 g cyclohexane, 31.2 g styrene, 112.3 g butadiene, and 1.1 g ethyl tetrahydrofurfuryl ether into a 5 L stainless steel stirred tank reactor under high-purity nitrogen shielding, heat up to 50° C., add 1.1 mmol n-butyl lithium and control the pressure at 0.2 MPa to initiate reaction, and let the reaction to proceed for 2 h, to obtain a solution that comprises diene polymer. The number-average molecular weight of the diene polymer is 182,000; in addition, calculated on the basis of the weight of conjugated diene structural units in the diene polymer, the content of conjugated diene structural units that comprise double bonds in their branched chains in the diene polymer is 43.02 wt %, the content of styrene structural units is 21.74 wt %, and the content of butadiene structural units is 78.26 wt %.

(2) add 0.8 mL (0.836 g) trimethoxysilylpropanethiol into the product obtained in step (1) and immediately take samples and test the amount of mercapto group; then, heat up to 80° C. and add 6.7 mg 2,2'-azobis(2-methylpropionitrile), control the pressure at 0.2 MPa and let the reaction to proceed for 3 h, to obtain a functional diene polymer, take samples and test the amount of mercapto group, and take samples and dry the samples for 12 h in vacuum at 60° C., and then extract, dry for 12 h in vacuum at 60° C., and carry out $^1$HNMR test. Add 0.2 g Irganox 1520 aging inhibitor into the functional diene polymer, and dry the mixture for 24 h in vacuum at 60° C. The conversion ratio of mercapto group is 79%, the Mooney viscosity of the functional diene polymer is 45, the number-average molecular weight is 182,000, and the molecular weight distribution is 1.1; calculated on the basis of the total weight of the functional diene polymer, the content of trimethoxysilylpropanethiol functional units is 0.46 wt %. The content of silane coupler functional units calculated according to the peak area in the $^1$HNMR spectrogram is 0.44 wt %. The polymer doesn't emit any offensive odor.

Example II-2

(1) Add 2,288 g cyclohexane, 31.2 g styrene, 112.3 g butadiene, and 0.9 g ethyl tetrahydrofurfuryl ether into a 5 L (2) add 3.0 mL (3.135 g) trimethoxysilylpropanethiol into the product obtained in step (1) and immediately take samples and test the amount of mercapto group; then, heat up to 90° C. and add 30 mg 2,2'-azobis(2-methylpropionitrile), control the pressure at 0.5 MPa and let the reaction to proceed for 0.5 h, to obtain a functional diene polymer, take samples and test the amount of mercapto group, and take samples and dry the samples for 12 h in vacuum at 60° C., and then extract, dry for 12 h in vacuum at 60° C., and carry out $^1$HNMR test. Add 0.2 g Irganox 1520 aging inhibitor into the functional diene polymer, and dry the mixture for 24 h in vacuum at 60° C. The conversion ratio of mercapto group is 89%, the Mooney viscosity of the functional diene polymer is 55, the number-average molecular weight is 194,000, and the molecular weight distribution is 1.09; calculated on the basis of the total weight of the functional diene polymer, the content of trimethoxysilylpropanethiol functional units is 1.91 wt %. The content of silane coupler functional units calculated according to the peak area in the $^1$HNMR spectrogram is 1.88 wt %. The polymer doesn't emit any offensive odor.

Example II-3

(1) Add 2,288 g cyclohexane, 62.4 g styrene, 248.6 g butadiene, and 1.3 g ethyl tetrahydrofurfuryl ether into a 5 L stainless steel stirred tank reactor under high-purity nitrogen shielding, heat up to 50° C., add 1.1 mmol n-butyl lithium and control the pressure at 0.25 MPa to initiate reaction, and let the reaction to proceed for 1 h, to obtain a solution that comprises diene polymer. The number-average molecular weight of the diene polymer is 205,000; in addition, calculated on the basis of the weight of conjugated diene structural units in the diene polymer, the content of conjugated diene structural units that comprise double bonds in their branched chains in the diene polymer is 51.05 wt %, the content of styrene structural units is 20.06 wt %, and the content of butadiene structural units is 79.94 wt %.

(2) add 1.9 mL (1.986 g) trimethoxysilylpropanethiol into the product obtained in step (1) and immediately take samples and test the amount of mercapto group; then, heat up to 80° C.

and add 13 mg 2,2'-azobis(2-methylpropionitrile), control the pressure at 0.3 MPa and let the reaction to proceed for 1 h, to obtain a functional diene polymer, take samples and test the amount of mercapto group, and take samples and dry the samples for 12 h in vacuum at 60° C., and then extract, dry for 12 h in vacuum at 60° C., and carry out $^1$HNMR test. Add 0.4 g Irganox 1520 aging inhibitor into the functional diene polymer, and dry the mixture for 24 h in vacuum at 60° C. The conversion ratio of mercapto group is 78%, the Mooney viscosity of the functional diene polymer is 59, the number-average molecular weight is 205,000, and the molecular weight distribution is 1.1; calculated on the basis of the total weight of the functional diene polymer, the content of trimethoxysilylpropanethiol functional units is 0.50 wt %. The content of silane coupler functional units calculated according to the peak area in the $^1$HNMR spectrogram is 0.48 wt %. The polymer doesn't emit any offensive odor.

Example II-4

Prepare a functional diene polymer with the method described in the Example II-3, but change the feed amount of the trimethoxysilylpropanethiol to 7.3 ml (7.629 g), to obtain the functional diene polymer. The conversion ratio of mercapto group is 63%, the Mooney viscosity of the diene polymer is 54, the number-average molecular weight is 207,000, and the molecular weight distribution is 1.1; calculated on the basis of the total weight of the diene polymer, the content of trimethoxysilylpropanethiol functional units is 1.52 wt %. The content of silane coupler functional units calculated according to the peak area in the $^1$HNMR spectrogram is 1.50 wt %. The polymer doesn't emit any offensive odor.

Example II-5

Prepare a functional diene polymer with the method described in the Example II-3, but replace the trimethoxysilylpropanethiol with 2-(trimethylsilyl) ethanethiol in the same pbw, to obtain the functional diene polymer. The conversion ratio of mercapto group is 65%, the Mooney viscosity of the diene polymer is 52, the number-average molecular weight is 203,000, and the molecular weight distribution is 1.1; calculated on the basis of the total weight of the diene polymer, the content of 2-trimethylsilyl ethanethiol functional units is 0.41 wt %. The content of silane coupler functional units calculated according to the peak area in the $^1$HNMR spectrogram is 0.39 wt %. The polymer doesn't emit any offensive odor.

Comparative Example II-1

Prepare a diene polymer with the method described in the Example II-3, but exclude the step (2), to obtain the diene polymer. In the diene polymer, the Mooney viscosity is 48, the number-average molecular weight is 190,000, and the molecular weight distribution is 1.1. Calculated on the basis of the total weight of the diene polymer, the content of styrene structural units is 20.06 wt %, and the content of butadiene structural units is 79.94 wt %.

Comparative Example II-2

(1) Add 1500 g cyclohexane, 20 g butadiene and 2.7 g ethyl tetrahydrofurfuryl ether into a 5 L stainless steel stirred tank reactor under high-purity nitrogen shielding, heat up to 40° C., add 12 mmol n-butyl lithium and control the pressure at 0.4 MPa to initiate reaction, and let the reaction to proceed for 1 h, to obtain a solution that comprises diene polymer. The number-average molecular weight of the diene polymer is 1,000; in addition, calculated on the basis of the weight of butadiene structural units in the diene polymer, the content of conjugated diene structural units that comprise double bonds in their branched chains in the diene polymer is 67 wt %.

(2) add 20 g trimethoxysilylpropanethiol into the product obtained in step (1) and immediately take samples and test the amount of mercapto group; then, heat up to 100° C. and add 1 g dilauroyl peroxide, control the pressure at 0.4 MPa and let the reaction to proceed for 5 h, to obtain a functional diene polymer, take samples and test the amount of mercapto group, and take samples and dry the samples for 12 h in vacuum at 60° C., and then extract, dry for 12 h in vacuum at 60° C., and carry out $^1$HNMR test. Finally, dry for 24 h in vacuum at 80° C. The conversion ratio of mercapto group is 80%, and the number-average molecular weight of the diene polymer is 1788. Calculated on the basis of the total weight of the diene polymer, the content of trimethoxysilylpropanethiol functional units is 44.4 wt %. The content of silane coupler functional units calculated according to the peak area in the $^1$HNMR spectrogram is 43.3 wt %.

Example II-6

(1) Add 2,288 g cyclohexane, 31.20 g vinyl toluene, 82.30 g butadiene, 30.00 g isoprene, and 0.65 g tetrahydrofuran into a 5 L stainless steel stirred tank reactor under high-purity nitrogen shielding, heat up to 40° C., add 1.0 mmol n-butyl lithium and control the pressure at 0.1 MPa to initiate reaction, and let the reaction to proceed for 2 h, to obtain a solution that comprises an olefinic polymer; wherein, the number-average molecular weight of the olefinic polymer is 183,000; in addition, calculated on the basis of the total weight of conjugated diene structural units in the olefinic polymer, the content of conjugated diene structural units that comprise double bonds in their branched chains in the olefinic polymer is 33.02 wt %, the content of the vinyl toluene structural units is 21.74 wt %, the content of butadiene structural units is 57.35 wt %, and the content of isoprene structural units is 20.91 wt %.

(2) add 0.6 mL (0.627 g) trimethoxysilylpropanethiol into the product obtained in step (1) and immediately take samples and test the amount of mercapto group; then, heat up to 80° C. and add 29 mg 2,2'-azobis(2-methylpropionitrile), control the pressure at 0.1 MPa and let the reaction to proceed for 5 h, to obtain a functional diene polymer, take samples and test the amount of mercapto group, and take samples and dry the samples for 12 h in vacuum at 60° C., and then extract, dry for 12 h in vacuum at 60° C., and carry out $^1$HNMR test. Add 0.2 g Irganox 1520 aging inhibitor into the functional diene polymer, and dry the mixture for 2 h in vacuum at 60° C. The conversion ratio of mercapto group is 82%, the Mooney viscosity of the functional diene polymer is 49, the number-average molecular weight is 183,000, and the molecular weight distribution is 1.08; calculated on the basis of the total weight of the functional diene polymer, the content of trimethoxysilylpropanethiol functional units is 0.35 wt %. The content of silane coupler functional units calculated according to the peak area in the $^1$HNMR spectrogram is 0.33 wt %. The polymer doesn't emit any offensive odor.

Example II-7

(1) Add 2,288 g cyclohexane, 62.40 g styrene, 128.60 g butadiene, 120.00 g isoprene, and 1.5 g ethyl tetrahydrofurfuryl ether into a 5 L stainless steel stirred tank reactor under high-purity nitrogen shielding, heat up to 70° C., add 1.1 mmol n-butyl lithium and control the pressure at 0.2 MPa to initiate reaction, and let the reaction to proceed for 1.2 h, to obtain a solution that comprises an olefinic polymer; wherein, the number-average molecular weight of the olefinic polymer is 191,000; in addition, calculated on the basis of the total weight of conjugated diene structural units in the olefinic polymer, the content of conjugated diene structural units that comprise double bonds in their branched chains in the olefinic polymer is 47.30 wt %, the content of the styrene structural units is 20.06 wt %, the content of butadiene structural units is 41.35 wt %, and the content of isoprene structural units is 38.59 wt %.

(2) add 1.9 mL (1.986 g) trimethoxysilylpropanethiol into the product obtained in step (1) and immediately take samples and test the amount of mercapto group; then, heat up to 70° C. and add 10 mg 2,2'-azobis(2-methylpropionitrile), control the pressure at 0.25 MPa and let the reaction to proceed for 1.2 h, to obtain a functional diene polymer, take samples and test the amount of mercapto group, and take samples and dry the samples for 12 h in vacuum at 60° C., and then extract, dry for 12 h in vacuum at 60° C., and carry out $^1$HNMR test. Add 0.4 g Irganox 1520 aging inhibitor into the functional diene polymer, and dry the mixture for 24 h in vacuum at 60° C. The conversion ratio of mercapto group is 82%, the Mooney viscosity of the functional diene polymer is 49, the number-average molecular weight is 191,000, and the molecular weight distribution is 1.08; calculated on the basis of the total weight of the functional diene polymer, the content of trimethoxysilylpropanethiol functional units is 0.53 wt %. The content of silane coupler functional units calculated according to the peak area in the $^1$HNMR spectrogram is 0.51 wt %. The polymer doesn't emit any offensive odor.

Example II-8

(1) Add 2,288 g cyclohexane, 49.6 g styrene, 260.4.6 g butadiene, and 2.1 g ethyl tetrahydrofurfuryl ether into a 5 L stainless steel stirred tank reactor under high-purity nitrogen shielding, heat up to 40° C., add 1.1 mmol n-butyl lithium and control the pressure at 0.25 MPa to initiate reaction, and let the reaction to proceed for 1 h, to obtain a solution that comprises diene polymer. The number-average molecular weight of the diene polymer is 198,000; in addition, calculated on the basis of the weight of conjugated diene structural units in the diene polymer, the content of conjugated diene structural units that comprise double bonds in their branched chains in the diene polymer is 61.4 wt %, the content of styrene structural units is 15.8 wt %, and the content of butadiene structural units is 84.2 wt %.

(2) add 6.2 mL (6.138 g) triethoxysilylpropanethiol into the product obtained in step (1) and immediately take samples and test the amount of mercapto group; then, heat up to 70° C. and add 15 mg 2,2'-azobis(2-methylpropionitrile), control the pressure at 0.3 MPa and let the reaction to proceed for 2 h, to obtain a functional diene polymer, take samples and test the amount of mercapto group, and take samples and dry the samples for 12 h in vacuum at 60° C., and then extract, dry for 12 h in vacuum at 60° C., and carry out $^1$HNMR test. Add 0.4 g Irganox 1520 aging inhibitor into the functional diene polymer, and dry the mixture for 24 h in vacuum at 60° C. The conversion ratio of mercapto group is 89%, the Mooney viscosity of the functional diene polymer is 59, the number-average molecular weight is 198,000, and the molecular weight distribution is 1.1. Calculated on the basis of the total weight of the functional diene polymer, the content of triethoxysilylpropanethiol functional units is 1.73 wt %. The $^1$HNMR spectrogram of the functional diene polymer is shown in the attached FIGURE. In the attached FIGURE, the quartet at 3.8 chemical shift is the characteristic peak of the hydrogen atom on the methylene adjacent to oxygen atom in the silane coupler, and the content of silane coupler functional units calculated according to the peak area in the $^1$HNMR spectrogram is 1.72 wt %. The polymer doesn't emit any offensive odor.

Example II-9~II-16

(1) Preparation of Compound Mix

Mix homogeneously 100 pbw functional diene polymer prepared in the Example II-1~II-8 with 1 pbw stearic acid (SA1801, from SUMI ASIH), 10 pbw MSAF N220 (from Tianjin Jinqiushi (Carbon Black) Chemical Co., Ltd.), 60 pbw white carbon black 115GR (from Degussa) respectively, and carry out heat treatment in a Haake unit, wherein, the heat treatment temperature is 150° C., the rotation speed is 30 rpm, and the heat treatment duration is 7 min. After the heat treatment, load the mixture into a compounding mill, and add 2.5 pbw zinc oxide (from Liuzhou Zinc Product Co., Ltd.), 1 pbw stearic acid (SA1801, from SUMI ASIH), 2 pbw aging inhibitor 4020, 1.4 pbw N-cyclohexyl-2-benzothiazol sulphenamide (CZ, from Hebi Lianhao Chemical Co., Ltd.), 0.75 pbw diphenyl guanidine (DPG, from Guangzhou Lida Rubber Material Trade Co., Ltd.), and 6 pbw silane coupler Si (from Degussa), and carry out compounding for 60 min. at 50±5° C., to obtain compound mix H-II-1~H-1I-8.

(2) Preparation of Vulcanized Rubber

Carry out vulcanization treatment for the compound mix H-II-1~H-II-8 obtained in step (1) in a press vulcanizer at 150° C. temperature and 12 MPa pressure respectively, to obtain vulcanized rubber S-II-1~S-II-8. The properties of the vulcanized rubber are shown in Table 2.

Comparative Example II-3

Prepare rubber with the method described in the Example II-5, but replace the functional diene polymer prepared in the Example II-1 with the diene polymer obtained in the Comparative Example I-1, and change the feed amount of diene polymer to 99.54 pbw; in addition, add 0.46 pbw trimethoxysilylpropanethiol in the preparation process of the compound mix; in that way, a comparative vulcanized rubber DS-II-1 is obtained. The properties of the vulcanized rubber are shown in Table 2.

Comparative Example II-4

Prepare rubber with the method described in the Example II-5, but replace the functional diene polymer prepared in the Example II-1 with a mixture of 98.96.17 pbw diene polymer obtained in the Comparative Example II-1 and 1.04 pbw diene polymer obtained in the Comparative Example II-2, to obtain a comparative vulcanized rubber DS-II-2. The properties of the vulcanized rubber are shown in Table 2.

TABLE 2

| Item | S-II-1 | S-II-2 | S-II-3 | S-II-4 | S-II-5 | DS-II-1 | DS-II-2 | S-II-6 | S-II-7 | S-II-8 |
|---|---|---|---|---|---|---|---|---|---|---|
| Tg/° C. | −29.12 | −27.73 | −29.36 | −27.13 | −27.60 | −28.69 | — | −33.96 | −28.42 | −26.70 |
| Ultimate tensile strength/Mpa | 18.2 | 20.1 | 21.7 | 21.0 | 20.7 | 22.5 | 20.3 | 17.9 | 21.3 | 17.2 |
| Specific elongation/% | 252 | 201 | 243 | 201 | 207 | 308 | 399 | 289 | 233 | 200 |
| Shore hardness A | 72 | 74 | 72 | 74 | 74 | 76 | 72 | 72 | 72 | 76 |
| Permanent deformation/% | 4 | 4 | 4 | 4 | 4 | 7 | 11 | 4 | 4 | 4 |
| Heat generation/° C. | 26.6 | 26.1 | 26.9 | 25.8 | 25.9 | 28.0 | 27.9 | 26.8 | 26.6 | 25.7 |
| tanδ (0° C.) | 0.9935 | 0.9746 | 0.9873 | 0.9751 | 0.9824 | 0.9397 | 0.9425 | 0.9533 | 0.9571 | 0.8908 |
| tanδ (60° C.) | 0.0725 | 0.0757 | 0.0731 | 0.0698 | 0.0703 | 0.0901 | 0.0911 | 0.0603 | 0.0731 | 0.0626 |
| tanδ (0°C.) /tanδ (60° C.) | 13.70 | 12.87 | 13.51 | 13.97 | 13.97 | 10.43 | 10.35 | 15.81 | 13.09 | 14.23 |

It can be seen from the above result: not only the relationship between the wet slip resistance and the rolling resistance of the diene polymer provided in the disclosure is effectively improved, but also the offensive odor produced in the rubber mixing process owing to the addition of the silane coupler is reduced.

The invention claimed is:

1. A functional diene polymer, which comprises at least one type of conjugated diene structural units in its molecular chain, wherein, the functional diene polymer further comprises silane coupler functional units represented by formula (I) in its molecular chain, and the number-average molecular weight of the diene polymer is 50,000~1,000,000;

formula (I)

wherein, $R_1$-$R_4$ are $C_1$-$C_{20}$ linear or branched alkyl or heteroatom-containing $C_1$-$C_{20}$ linear or branched alkyl, and the heteroatom is selected from one or more of halogen, oxygen, sulfur, silicon, and phosphorus.

2. The functional diene polymer according to claim 1, wherein calculated on the basis of the total weight of the functional diene polymer, the content of the conjugated diene structural units is 90-99.99 wt %, and the content of the silane coupler functional units is 0.01-10 wt %.

3. The functional diene polymer according to claim 1, wherein the functional diene polymer further comprises monovinylarene structural units in its molecular chain, and, calculated on the basis of the total weight of the functional diene polymer, the total content of the monovinylarene structural units and conjugated diene structural units is 90-99.99 wt %, the content of the silane coupler functional units is 0.01-10 wt %.

4. The functional diene polymer according to claim 3, wherein the weight ratio of the monovinylarene structural units to the conjugated diene structural units is 5:95~60:40.

5. The functional diene polymer according to claim 1, wherein the conjugated diene structural units are structural units derived from conjugated diene, and the conjugated diene is selected from one or more of butadiene, isoprene, 1,3-pentylene, 1,3-hexadiene, and 2,3-dimethyl butadiene.

6. The functional diene polymer according to claim 1, wherein, in the formula (I):
$R_1$-$R_3$ are methoxyl, and $R_4$ is propylidene; or,
$R_1$-$R_3$ are ethyoxy, and $R_4$ is propylidene; or,
$R_1$-$R_3$ are methyl, and $R_4$ is ethylidene.

7. The functional diene polymer according to claim 1, wherein the $^1$HNMR spectrogram of the functional diene polymer exhibits a quartet at 3.7-3.9 chemical shift.

8. The functional diene polymer according to claim 6, wherein the $^1$HNMR spectrogram of the functional diene polymer exhibits a quartet at 3.7-3.9 chemical shift.

9. A preparation method of a functional diene polymer, comprising the following steps:
(1) in inert atmosphere and in the presence of an initiator, controlling a polymerizable monomer that comprises at least one type of conjugated diene to have polymerization reaction in a solvent, to obtain a reaction product that comprises a diene polymer, under reaction conditions that ensure the number-average molecular weight of the obtained diene polymer is 50,000~1,000,000, wherein, calculated on the basis of the weight of the conjugated diene structural units in the diene polymer, the content of conjugated diene structural units that comprise double bonds in their branched chains in the diene polymer is 15-85 wt %;
(2) in inert atmosphere and in the presence of an initiator, controlling the obtained reaction product that comprises a diene polymer to contact with a silane coupler, such that the silane coupler is chemically bonded to the diene polymer, wherein the silane coupler has a structure represented by formula (II):

formula (II)

wherein, $R_1$-$R_4$ are $C_1$-$C_{20}$ linear or branched alkyl or heteroatom-comprising $C_1$-$C_{20}$ linear or branched alkyl, and the heteroatom is selected from one or more of halogen, oxygen, sulfur, silicon, and phosphorus.

10. The preparation method according to claim 9, wherein the polymerizable monomer also comprises monovinylarene, and the weight ratio of the monovinylarene to the conjugated diene is 5:95~60:40.

11. The preparation method according to claim 9, wherein the polymerization reaction conditions include: polymerization temperature: 10-160° C.; polymerization pressure: 0.05-0.5 MPa; polymerization duration: 0.5-10 h; the conditions of contact between the diene polymer and the silane coupler include: contact temperature: 20-150° C.; contact pressure: 0.01-1 MPa; contact duration: 0.2-24 h.

12. The preparation method according to claim 9, wherein calculated on the basis of 100 g diene polymer, the amount of the silane coupler is 0.01-10 g.

13. A rubber composition comprising olefinic rubber, vulcanizing agent, vulcanization accelerator, strengthening agent, and activating agent, wherein the olefinic rubber comprises the functional diene polymer according to claim 1.

14. The rubber composition according to claim 13, wherein calculated on the basis of the total weight of the olefinic rubber, the content of the functional diene polymer in the olefinic rubber is 50-100 wt %.

15. The rubber composition according to claim 14, wherein the olefinic rubber also comprises mixed rubber selected from one or more of natural rubber, polybutadiene rubber, styrene-butadiene rubber, polyisoprene rubber, neoprene rubber, butyl rubber, and ethylene propylene diene terpolymer rubber.

16. The rubber composition according to claim 15, wherein calculated on the basis of 100 pbw functional diene polymer, the content of the mixed rubber is 10-40 pbw, the content of the vulcanizing agent is 1-3 pbw, the content of the vulcanization accelerator is 3-5 pbw, the content of the strengthening agent is 70-90 pbw, and the content of the activating agent is 3-4 pbw.

17. A rubber composition comprising olefinic rubber, vulcanizing agent, vulcanization accelerator, strengthening agent, and activating agent, wherein the olefinic rubber comprises the functional diene polymer according to claim 7.

18. The rubber composition according to claim 17, wherein calculated on the basis of the total weight of the olefinic rubber, the content of the functional diene polymer in the olefinic rubber is 50-100 wt %.

19. A rubber composition comprising olefinic rubber, vulcanizing agent, vulcanization accelerator, strengthening agent, and activating agent, wherein the olefinic rubber comprises the functional diene polymer according to claim 8.

20. The rubber composition according to claim 19, wherein calculated on the basis of the total weight of the olefinic rubber, the content of the functional diene polymer in the olefinic rubber is 50-100 wt %.

* * * * *